(12) United States Patent
Brown et al.

(10) Patent No.: US 7,475,730 B2
(45) Date of Patent: Jan. 13, 2009

(54) METHOD OF TREATING WELL WITH FOAMED COMPOSITION

(75) Inventors: James Michael Brown, Tomball, TX (US); John Gregory Darby, Lafayette, LA (US)

(73) Assignee: BJ Services Company, Houston, TX (US)

( * ) Notice: Subject to any disclaimer, the term of this patent is extended or adjusted under 35 U.S.C. 154(b) by 4 days.

(21) Appl. No.: 11/714,683

(22) Filed: Mar. 6, 2007

(65) Prior Publication Data
US 2008/0217017 A1    Sep. 11, 2008

(51) Int. Cl.
*E21B 37/06* (2006.01)

(52) U.S. Cl. .................. 166/309; 166/300; 166/304; 166/310

(58) Field of Classification Search .................. None
See application file for complete search history.

(56) References Cited

U.S. PATENT DOCUMENTS

| | | | |
|---|---|---|---|
| 4,201,678 A | * | 5/1980 | Pye et al. .................. 507/102 |
| 4,775,489 A | * | 10/1988 | Watkins et al. ............. 507/202 |
| 5,376,749 A | | 12/1994 | Miller et al. |
| 5,453,207 A | | 9/1995 | Simpson et al. |
| 5,484,488 A | | 1/1996 | Hart et al. |
| 5,741,758 A | | 4/1998 | Pakulski |
| 6,051,535 A | | 4/2000 | Bilden et al. |
| 6,410,489 B1 | | 6/2002 | Zhang et al. |
| 6,866,797 B1 | | 3/2005 | Martin et al. |
| 7,028,776 B2 | | 4/2006 | Kirk |
| 2004/0121917 A1 | | 6/2004 | Pakulski |
| 2006/0124301 A1 | | 6/2006 | Gupta et al. |
| 2006/0124302 A1 | | 6/2006 | Gupta et al. |
| 2006/0223713 A1 | | 10/2006 | Pakulski et al. |

* cited by examiner

*Primary Examiner*—Zakiya W. Bates
(74) *Attorney, Agent, or Firm*—Jones & Smith, LLP; John Wilson Jones

(57) ABSTRACT

The annular surface between the tubing and casing of an oil or gas well may be contacted with a foamed well treatment composition containing a gas, a foaming agent and a liquid well treatment agent, such as a scale inhibitor, corrosion inhibitor, salt inhibitor, scale remover or biocide. The foam, upon destabilization, renders a thin film of concentrated well treatment agent on the external surfaces of the tubing, inside the casing and in the perforations.

22 Claims, 1 Drawing Sheet

METHOD OF TREATING WELL WITH FOAMED COMPOSITION

FIELD OF THE INVENTION

Unwanted contaminants may be inhibited and/or destroyed and/or removed by introducing into a gas or oil well a foamed composition containing a well treatment agent.

BACKGROUND OF THE INVENTION

Oilfield fluids (e.g., oil, gas, and water) are generally complex mixtures of aliphatic hydrocarbons, aromatics, heteroatomic molecules, anionic and cationic salts, acids, sands, silts, clays and a vast array of other components. The nature of these fluids, combined with the severe conditions of heat, pressure, and turbulence to which they are often subjected, are contributory factors to the formation and deposition of unwanted contaminants, such as scales, salts, paraffins, corrosion, bacteria and asphaltenes in oil and/or gas production wells.

A common site for the formation and deposition of such contaminants is the annular space between the production tubing and casing of oil or gas wells. The annulus may be a static area or may produce gas or liquid. In low pressure gas wells, such as coal bed methane wells, the gas is produced up the annulus and the liquid (water) is allowed to fall to the liquid level and removed via a submersible pump up the tubing. Such undesirable substances as salt, scales, paraffins and asphaltenes, form due to the pressure changes at the perforations. Alternatively, such substances form due to comingling of incompatible waters from one set of perforations to another.

The formation and deposition of such unwanted contaminants decrease permeability of the subterranean formation and reduce well productivity. For instance, in some completions, the presence of scale in the annulus may make it difficult or impossible to remove the tubing for servicing. While there are a number of approaches to these production problems in the patent and journal literature, nearly all of them deal with the problem on an individual basis as they form, which can be costly when numerous problems arise during production. A further problem with such an approach is the cost of tracking and monitoring such production problems. For example, the technique of "downhole squeezing" is commonly used to address oil field scale formation, wherein a slug of the well treatment composition is injected into the annulus, using a pre-flush, squeeze, and overflush treatment before the well can be returned to normal function. However, the overflush process often flushes a significant portion of the well treatment agent such that the remaining well treatment agent is gradually removed from the surface as oil production continues. Thus, further descaling treatments are typically required. Further, such treatment methods are typically inefficient in that contact with all of the surfaces of the tubing external and casing internal is not completely achieved. As a result, large quantities of the well treatment agent are required.

Alternative treatment methods have therefore been sought for introducing well treatment agents into oil and/or gas wells and especially between the annular surface between the tubing and casing.

SUMMARY OF THE INVENTION

The invention relates to a method of contacting the annular surface between the tubing and casing with a foamed well treatment composition which contains a gas, a foaming agent and a liquid well treatment agent, such as a scale inhibitor, corrosion inhibitor, salt inhibitor, scale remover or biocide. Use of a foamed treatment composition is particularly advantageous since its liquid volume is low compared to its bulk volume. As a result, a foam quality greater than 90 percent is possible. Such low liquid volumes are advantageous due to economic savings in the volume of well treatment agent. In addition, such low liquid volumes impart a lower hydrostatic loading in the well.

The foam used in the foamed well treatment composition is self-supporting and is capable of completely packing the annular area of the well. The foamed well treatment composition may be generated on-site using a foam generator which blends the gas, foaming agent and liquid treatment agent under high shear. Nitrogen and inert gases, such as argon, are the preferred gases since they do not contribute to corrosion from oxygen contamination. Such gases from compressed cylinders may be used or the gas may be generated on-site. Produced natural gas can also be used as a gas for foam generation.

After a period of time, the foam breaks leaving behind a thin film of the concentrated well treatment agent on the external surfaces of the tubing, inside the casing and in the perforations. As a result, the method of the invention provides a lasting treatment to inhibit and/or remove scales, salts, asphaltenes, paraffins, corrosion, etc. The well treatment agent may further be a biocide and thus the method of the invention may be used to destroy bacterial contamination in the annulus.

The foaming agent is preferably amphoteric or anionic. Suitable amphoteric foaming agents include alkyl betaines, alkyl sultaines and alkyl carboxylates. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Cationic foaming agents may also be used, such as when the well treatment agent is cationic in nature, such as certain biocides. Suitable cationic foaming agents include alkyl quaternary ammonium salts, alkyl benzyl quaternary ammonium salts and alkyl amido amine quaternary ammonium salts.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
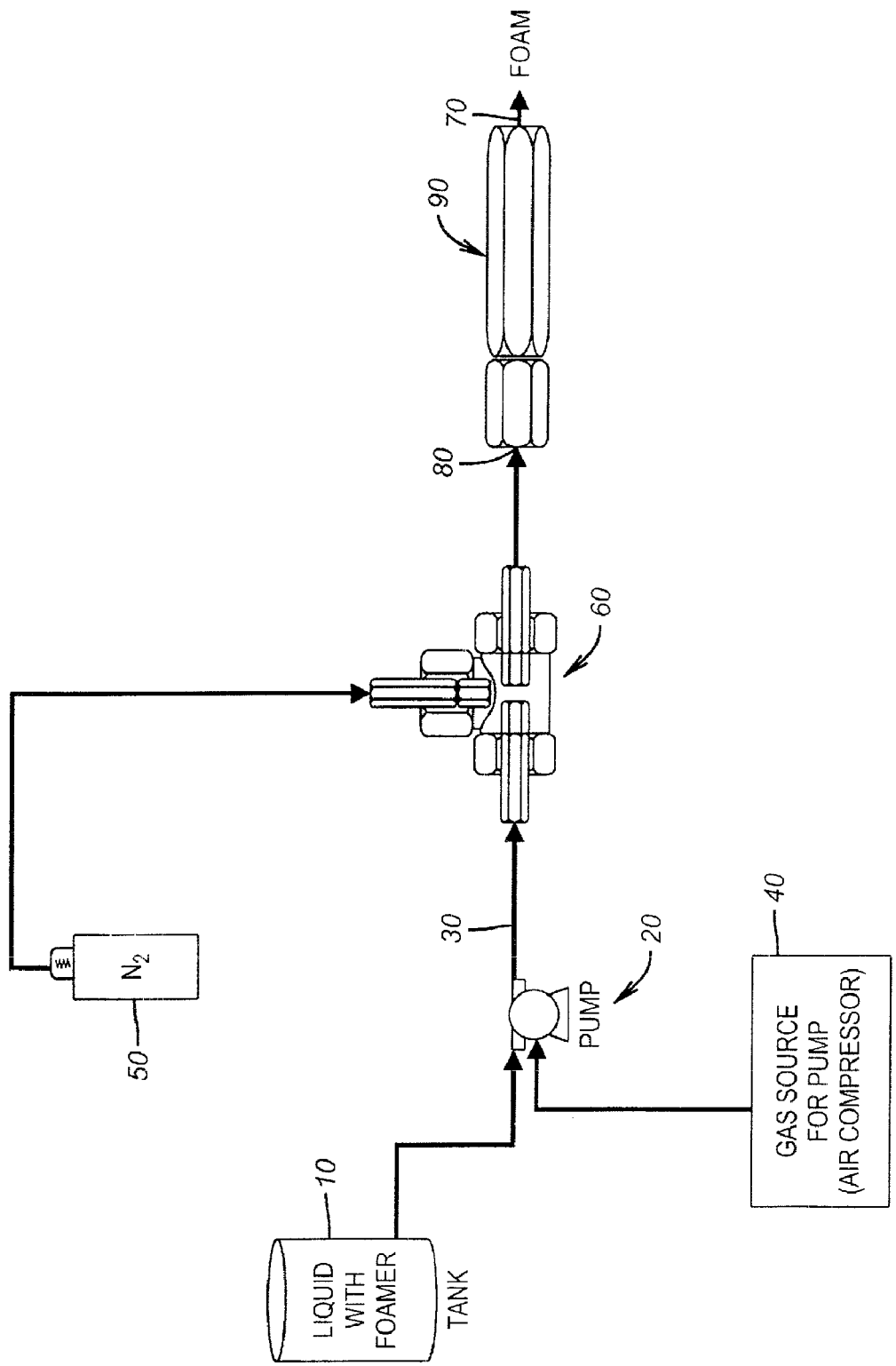
FIG. 1 is a schematic for a foam generator, used for preparation of the foamed well treatment composition on-site.

The foamed well treatment composition disclosed herein contains a well treatment agent which is capable of inhibiting the formation and/or deposition of such unwanted contaminants as scales, corrosion, salts, paraffins and asphaltenes. In addition, the well treatment agent may be one which is capable of removing such unwanted contaminants, such as a scale remover. In addition, the well treatment agent may be a biocide and thus the foamed well treatment composition may be used to eliminate the presence of bacteria.

In its preferred embodiments, the foamed well treatment composition is used to treat the annulus between the production tubing string and the casing string of an oil or gas well. Such annuli are devoid of sealing or isolation packers which are widely used to isolate one zone of the well from another zone.

While the foamed well treatment composition may be used to treat any type of well that requires annular treatment, in a preferred embodiment the foamed well treatment composition is used to treat low pressure wells. An example of low pressure wells suitable for using the foamed well treatment composition defined herein are those low pressure wells (of between about 1 to about 100 psi) such as coal bed methane wells produced through the casing. Such wells produce water associated with the gas which is then pumped through the tubing via rod pumps. These types of wells are perforated in many coal seams with varying productivity in each zone.

The foamed well treatment composition introduced into the annulus of the well contains, in addition to at least one well treatment agent, a gas, a foaming agent and at least one well treatment agent.

Exemplary of well treatment agents used in the foamed well treatment composition are one more of scale inhibitors, corrosion inhibitors, salt inhibitors, paraffin inhibitors, asphaltene inhibitors, scale removers and biocides as well as mixtures thereof.

The well treatment agent is preferably a liquid material. If the well treatment agent is a solid, it can be dissolved in a suitable solvent, thus making it a liquid.

The well treatment agents may be any of those commonly known in the art. In a preferred embodiment, the well treatment agent is a scale inhibitor selected from the group consisting of phosphates, phosphate esters, phosphoric acid, phosphonates, phosphonic acid, phosphonate/phosphonic acids, polyacrylamides, salts of acrylamido-methyl propane sulfonate/acrylic acid copolymers (AMPS/AA), phosphinated maleic copolymers (PHOS/MA), salts of a polymaleic acid/acrylic acid/acrylamido-methyl propane sulfonate terpolymer (PMA/AMPS) as well as mixtures thereof. Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) and sodium salt of polymaleic acid/acrylic acid/acrylamido-methyl propane sulfonate terpolymers (PMA/AMPS) are also effective scale inhibitors. Sodium salts are preferred.

Paraffin inhibitors useful for the practice of the present invention include, but are not limited to, ethylene/vinyl acetate copolymers, acrylates (such as polyacrylate esters and methacrylate esters of fatty alcohols) and olefin/maleic esters.

Exemplary corrosion inhibitors useful for the practice of the invention include but are not limited to fatty imidazolines, alkyl pyridines, alkyl pyridine quaternaries, fatty amine quaternaries and phosphate salts of fatty imidazolines.

Exemplary asphaltene treating chemicals include but are not limited to fatty ester homopolymers and copolymers (such as fatty esters of acrylic and methacrylic acid polymers and copolymers) and sorbitan monooleate.

The scale removal agents are typically acidic and may include hydrochloric acid, acetic acid and formic acid. However, caustic scale removal agents may also be used. Such caustic removal agents, of particular applicability in the removal of sulfate scales, include sodium hydroxide, chelants such as EDTA, glucoheptanate and urea.

Suitable foaming agents include, but are not limited to, those which are amphoteric, anionic and cationic. Preferred anionic foaming agents include betaines, alkyl ether sulfates, oxyalkylated sulfates, alkoxylated alcohol sulfates, phosphate esters, alkyl ether phosphates, alkoxylated alcohol phosphate esters, alkyl sulfates as well as alpha olefin sulfonates. Included as amphoteric surfactants are glycinates, amphoacetates, propionates, betaines and mixtures thereof. Cationic foaming agents are especially useful where the well treatment agent employed is also cationic. For instance, cationic foaming agents have particular applicability with cationic biocides. Suitable cationic foaming agents include alkyl quaternary ammonium salts, alkyl benzyl quaternary ammonium salts and alkyl amido amine quaternary ammonium salts.

Typically, the amount of foaming agent present in the foamed well treatment agent is that amount sufficient to give a foam quality of 90 percent or higher. The foam quality is a measurement of the lowest amount of liquid volume of well treatment agent that is required to effectuate the desired result. Thus, a 90 percent quality foam refers to the use of 100 ml of foamed well treatment agent which, upon destabilization, rendered 10 ml of liquid well treatment agent.

The gas used in the foamed well treatment composition is any gas which is acceptable for forming a foam for use in well treatment applications and includes nitrogen, inert gases like argon as well as produced natural gas.

The foamed well treatment compositions used in the invention do not require excessive amounts of well treatment agents. The amount of well treatment agent in the composition is that amount sufficient to effectuate the desired result over a sustained period of time. Generally, the amount of well treatment agent in the composition is from about 0.05 to about 5 (preferably from about 0.1 to about 2) volume percent based upon the total volume of the composition. Use of the foamed well treatment composition permits low liquid volumes of the well treatment agent to be used. Typically, the amount of well treatment agent used per treatment is no more than one to ten gallons. With some applications, even lower amounts may be used. For instance, the amount of scale inhibitor in the foamed well treating composition may be as low as 1 ppm. Costs of operation of the oil or gas well are significantly lowered when used in accordance with the procedures set forth herein. As a result of such operations, the surface of the contact area is completely covered though low amounts of the well treatment composition are used.

Generally, the lifetime of a single treatment using the foamed well treatment composition of the invention is between one and twelve months.

The foamed well treatment composition typically has a half-life less than or equal to 1 hour.

In a preferred embodiment, a truck mounted foam generating apparatus consisting of compressed gas bottles, such as nitrogen, one or more well treatment agent containing tanks, one or more foaming agent tanks, one or more associated chemical pumps and one or more foam generators may be used to travel to a designated well wherein the treatment is applied.

A suitable foam generating apparatus which may be used on-site is depicted in FIG. 1. A well treatment agent and liquid foaming agent are held in well treatment agent tank 10 and is introduced into line 30 via air pump 20. Pump 20 may be driven by gas from gas source 40. Alternatively an electric or engine powered pump could also be used. The liquid foaming agent is admixed with a gas, such as nitrogen, held in gas tank 50, in tee 60 under shear. The foamed well treatment composition enters into the wellhead at 70 after passing through small orifice 80 into hose 90.

The foamed well treatment composition introduced into the well is stable. After introduction into the well, the foam is allowed to break without the use of destabilizing agents or is broken or destabilized principally by the action of heat or, optionally, the presence of a defoaming agent. Suitable defoaming agents include silicones, alcohols and hydrocarbon fluids like diesel fuel. As a result of such destabilization, a thin concentrated film of the well treatment agent coats the outside of the tubing and/or inside of the casing of the packerless annulus. The thickness of the film will be dependent upon the amount of well treatment agent introduced into the annulus as a component of the foamed well treatment agent.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of volume percent except as may otherwise be indicated and the term "complex organic phosphate ester, free acid" refers to a product commercially available from Rhodia.

EXAMPLES

Examples 1-4

To a foaming agent composed of 60% $C_{14}$-$C_{15}$ alkyl olefin sulfate, 18% ammonium alkyl ether sulfate, 10% monoalkyl ester and 12% isopropyl alcohol was added a well treatment agent (WTA), water and nitrogen. The admixture was then foamed using the foaming apparatus set forth in FIG. 1. The foam quality of the foamed product was then determined. The results are set forth in Table I:

TABLE I

| Ex. No. | Foaming Agent, Amount | Type, WTA | WTA | WTA, Amount | Water | $N_2$ Pressure, psi | Foam Quality, % |
|---|---|---|---|---|---|---|---|
| 1 | 120 mls | Scale Remover | HCl, 28% | 140 mls | 12,000 mls | 40 | 95 |
| 2 | 120 mls | Scale Remover | HCl, 28% | 1 qt | 5 gallons | 60 | 97 |
| 3 | 2% | Scale Inhibitor | HEDP | 6% | Yes | 60 | 95 |
| 4 | 2% | Scale Inhibitor | HEDP | 12% | Yes | 60 | 97 |

HEDP = (hydroxyethylidenediphosphonic acid)

Examples 5-9

The foamed well treatment composition of Example 4 was introduced into an annulus at defined pressure. The residual concentration of well treatment agent was measured in produced water. The results are set forth in Table II:

TABLE II

| Ex. No. | Casing Pressure, psi | Tubing Pressure, psi | Nitrogen, psi | Injection Pressure, psi | Time to Pump, hrs:min | Liquid Volume, gallons | Residual After One Month |
|---|---|---|---|---|---|---|---|
| 5 | 18 | 6 | 80 | 18 | 1:15 | 36 | NA |
| 6 | 29 | 40 | 80 | 29 | 1:20 | 29 | 31.82 ppm |
| 7 | 14 | 0 | 75 | 14 | 2:20 | 42 | 145.29 ppm |
| 8 | 5 | 0 | 80 | 20 | 2:15 | 38 | 116.7 ppm |
| 9 | 20 | 0 | 75 | 25 | 4:00 | 43 | 26.25 ppm |

Example 10

A corrosion inhibitor was prepared by mixing 65.70 ml of deionized water, 25 ml of coco-dimethyl benzyl quat, 8 ml of complex organic phosphate ester, free acid, 0.2 ml of thioglycolic acid and 1.10% of monoethanolamine. Approximately 1 gallon of the corrosion inhibitor was mixed with 1 gallon of water and was then mixed with 1.5% of amphoteric cocoamidopropyl betaine as foaming agent to render 60 gallons of foam.

Examples 11-15

To a 1.5% amphoteric cocoamidopropyl betaine was added a well treatment agent (WTA) at 60 psi nitrogen pressure. The foam quality of the foamed product was then determined. The results are set forth in Table III:

TABLE III

| Ex. No. | Type, WTA | WTA | Foam Quality, % |
|---|---|---|---|
| 11 | Scale Inhibitor | 12% HEDP | 97 |
| 12 | Biocide | 20% THPS | 98 |
| 13 | Corrosion Inhibitor | Formula A, diluted 50% with water | 97 |
| 14 | Corrosion Inhibitor | Formula B, diluted 50% with water | 97 |
| 15 | Corrosion Inhibitor | Formula C, diluted 50% with water | 96 |

THPS = phosphonium tetrakis hydroxymethyl sulfate
Formula A: 58 ml deionized water, 24 ml methyl alcohol, 7 ml alkyl pyridine benzyl quaternary ammonium chloride/aliphatic and heterocyclic mono/diamine (non-ionic and anionic surfactant blend), 7 ml morpholine process residue and 4 ml complex organic phosphate ester, free acid.
Formula B: 47 ml of deionized water, 35 ml methyl alcohol, 2.5 ml complex organic phosphate ester, free acid, 10 ml coco dimethyl benzyl quat, 2.5 ml ethoxylated (15) soya alkylamines, 3 ml alkyl pyridine benzyl quaternary ammonium chloride.
Formula C: 58.5 ml deionized water, 24 ml methyl alcohol, 3 ml coco dimethyl benzyl quat, 2 ml complex organic phosphate ester, free acid, 6 ml alkyl pyridine benzyl quaternary ammonium chloride, 1.5 thioglycolic acid and 5 ml fatty imidazoline.

From the foregoing, it will be observed that numerous variations and modifications may be effected without departing from the true spirit and scope of the novel concepts of the invention.

What is claimed is:

1. A method of treating an oil or gas well which comprises:
   (a) introducing into a packerless annulus between the tubing and casing of the well, a foamed well treatment composition comprising a foaming agent and a well treatment agent, wherein the amount of foaming agent in the foamed well treatment composition is an amount sufficient to provide a foam quality to the foamed well treatment composition which is greater than or equal to 90%; and
   (b) coating onto the outside of the tubing and/or inside casing of the packerless annulus, upon destabilization of the foamed well treatment composition, a concentrated film of the well treatment agent.

2. The method of claim 1, wherein the well treatment composition contains at least one well treatment agent selected from the group consisting of scale inhibitors, corrosion inhibitors, salt inhibitors, paraffin inhibitors, asphaltene inhibitors, scale removers or biocides.

3. The method of claim 2, wherein the foaming agent is anionic or amphoteric.

4. The method of claim 1, wherein the well is a low pressure gas well.

5. The method of claim 4, wherein the well is a coal bed methane well.

6. The method of claim 1, wherein the foaming agent has a half-life less than or equal to 1 hour.

7. The method of claim 1, wherein the foaming agent is an anionic foaming agent selected from the group consisting of alkyl ether sulfates, alkoxylated ether sulfates, phosphate esters, alkyl ether phosphates, alkoxylated alcohol phosphate esters, alkyl sulfates and alpha olefin sulfonates.

8. A method of inhibiting and/or destroying unwanted contaminants in an oil or gas well comprising:
   (a) introducing into the packerless annulus between the tubing and casing of the well a foamed well treatment composition having at least one well treatment agent capable of inhibiting and/or destroying unwanted contaminants;
   (b) destabilizing the well treatment composition; and
   (c) coating a thin film concentrate of the well treatment agent over at least a portion of the outside of the tubing and/or inside of the casing of the annulus.

9. The method of claim 8, wherein the at least one well treatment agent is selected from the group consisting of scale inhibitors, corrosion inhibitors, salt inhibitors, paraffin inhibitors, asphaltene inhibitors, scale removers and biocides.

10. The method of claim 9, wherein the at least one well treatment agent is selected from the group consisting of scale inhibitors, corrosion inhibitors, paraffin inhibitors, asphaltene inhibitors and scale removers and further wherein:
   (a) the scale inhibitors are selected from the group consisting of phosphates, phosphate esters, phosphoric acid, phosphonates, phosphonic acid, phosphonate/phosphonic acids, polyacrylamides, salts of acrylamido-methyl propane sulfonate/acrylic acid copolymers (AMPS/AA), phosphinated maleic copolymers (PHOS/MA) and salts of a polymaleic acid/acrylic acid/acrylamido-methyl propane sulfonate terpolymer (PMA/AMPS);
   (b) the corrosion inhibitors are selected from the group consisting of fatty imidazolines, alkyl pyridines, alkyl pyridine quaternaries, fatty amine quaternaries and phosphate salts of fatty imidazolines;
   (c) the paraffin inhibitors are selected from the group consisting of ethylene/vinyl acetate copolymers, acrylates and olefin/maleic esters;
   (d) the asphaltene inhibitors are selected from the group consisting of fatty ester homopolymers and copolymers and sorbitan monooleate; or
   (e) the scale removal agents are selected from the group consisting of hydrochloric acid, acetic acid, formic acid, sodium hydroxide, EDTA chelants, glucoheptanate and urea.

11. The method of claim 8, wherein the well is a low pressure gas well.

12. The method of claim 8, wherein the well is a coal bed methane well.

13. The method of claim 8, wherein the foaming agent is anionic or amphoteric.

14. A method of treating an oil or gas well with a well treatment composition in order to inhibit and/or destroy unwanted contaminants in the annulus between the tubing and casing of the well, the method comprising introducing into the annulus a well treatment composition containing a foaming agent and a concentrate of at least one well treatment agent, wherein the well treatment agent is present in the well treatment composition in an amount sufficient such that a thin film of the concentrated well treatment agent coats at least a portion of the outside of the tubing and/or inside of the casing of the annulus upon destabilization of the foamed well treatment composition, wherein the annulus is devoid of a packer.

15. The method of claim 14, wherein the well treatment agent is at least member one selected from the group consisting of scale inhibitors, corrosion inhibitors, salt inhibitors, paraffin inhibitors, asphaltene inhibitors, scale removers and biocides.

16. The method of claim 14, wherein the well is a low pressure gas well.

17. The method of claim 16, wherein the well is a coal bed methane well.

18. The method of claim 14, wherein the foaming agent is anionic or amphoteric.

19. A method of treating an oil or gas well with a well treatment composition in order to inhibit and/or destroy unwanted contaminants in the annulus between the tubing and casing of the well, the method comprising introducing into the annulus a well treatment composition containing a foaming agent and at least one well treatment agent, wherein the well treatment agent is present in the well treatment composition in an amount sufficient such that a thin film of concentrate of the well treatment agent coats at least a portion of the outside of the tubing and/or inside of the casing of the annulus upon breaking of the foamed well treatment composition.

20. The method of claim 19, wherein the well treatment composition contains at least one well treatment agent selected from the group consisting of scale inhibitors, corrosion inhibitors, salt inhibitors, paraffin inhibitors, asphaltene inhibitors, scale removers or biocides.

21. The method of claim 19, wherein the well is a low pressure gas well.

22. The method of claim 21, wherein the well is a coal bed methane well.

\* \* \* \* \*